Jan. 20, 1959     K. H. CUBITT ET AL     2,869,635
AIRCRAFT HANGAR DOORS
Filed June 13, 1957     6 Sheets-Sheet 2
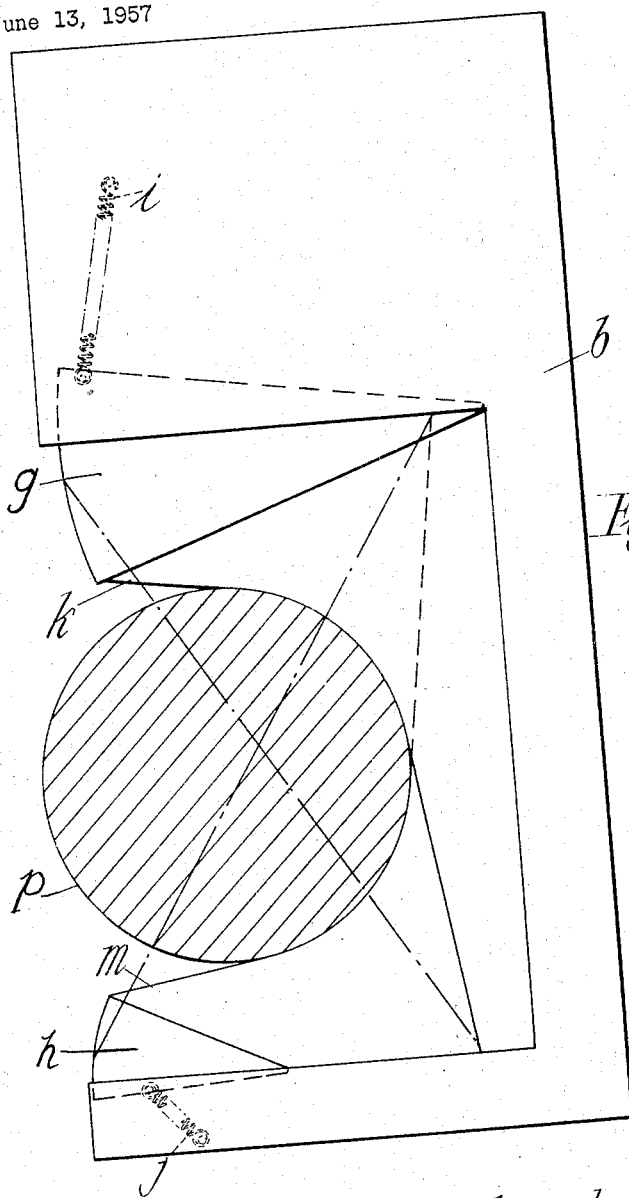
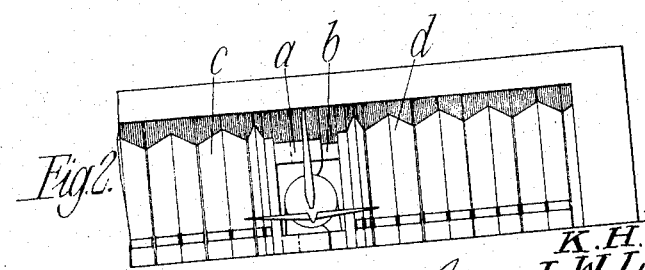

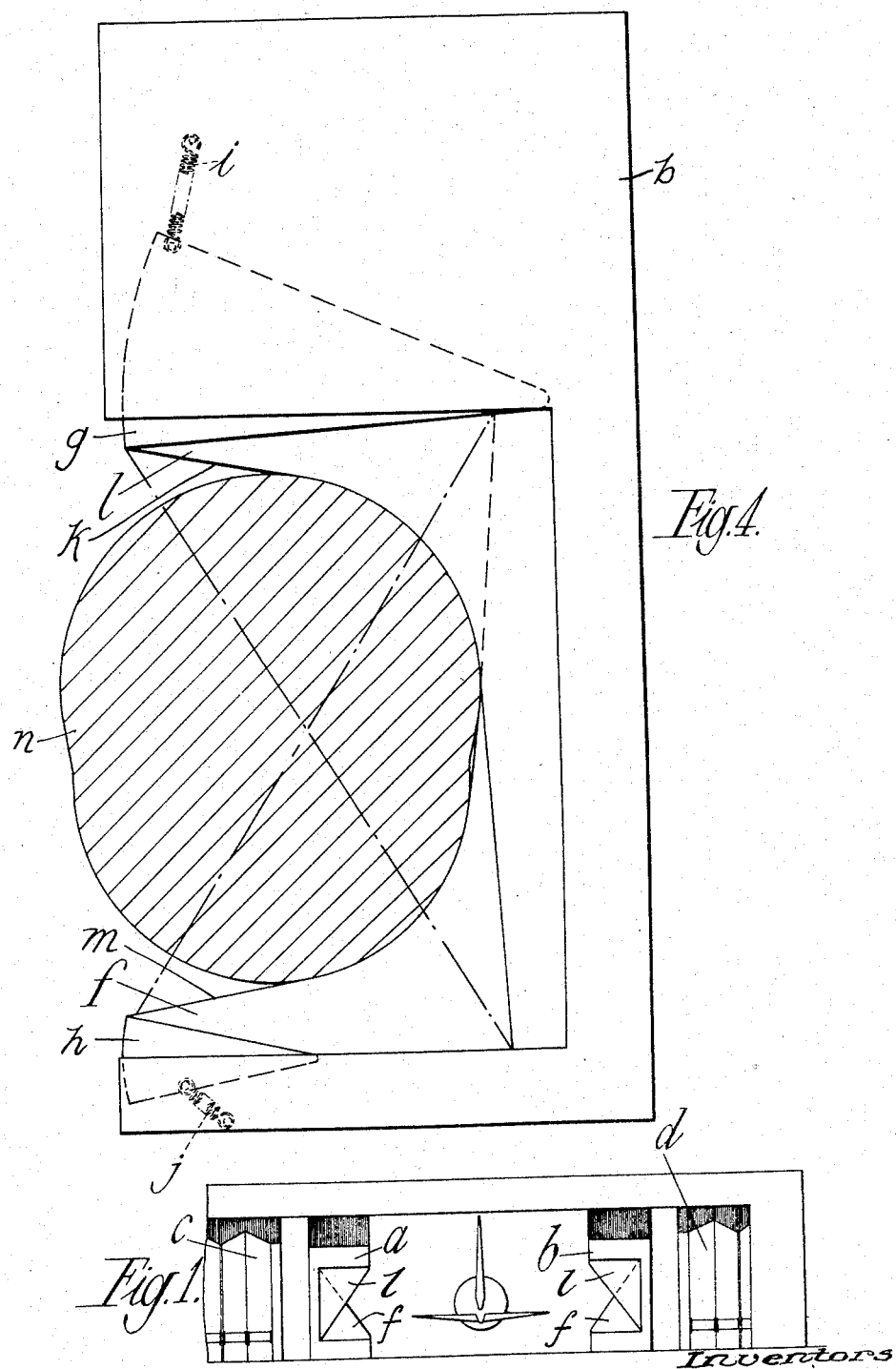

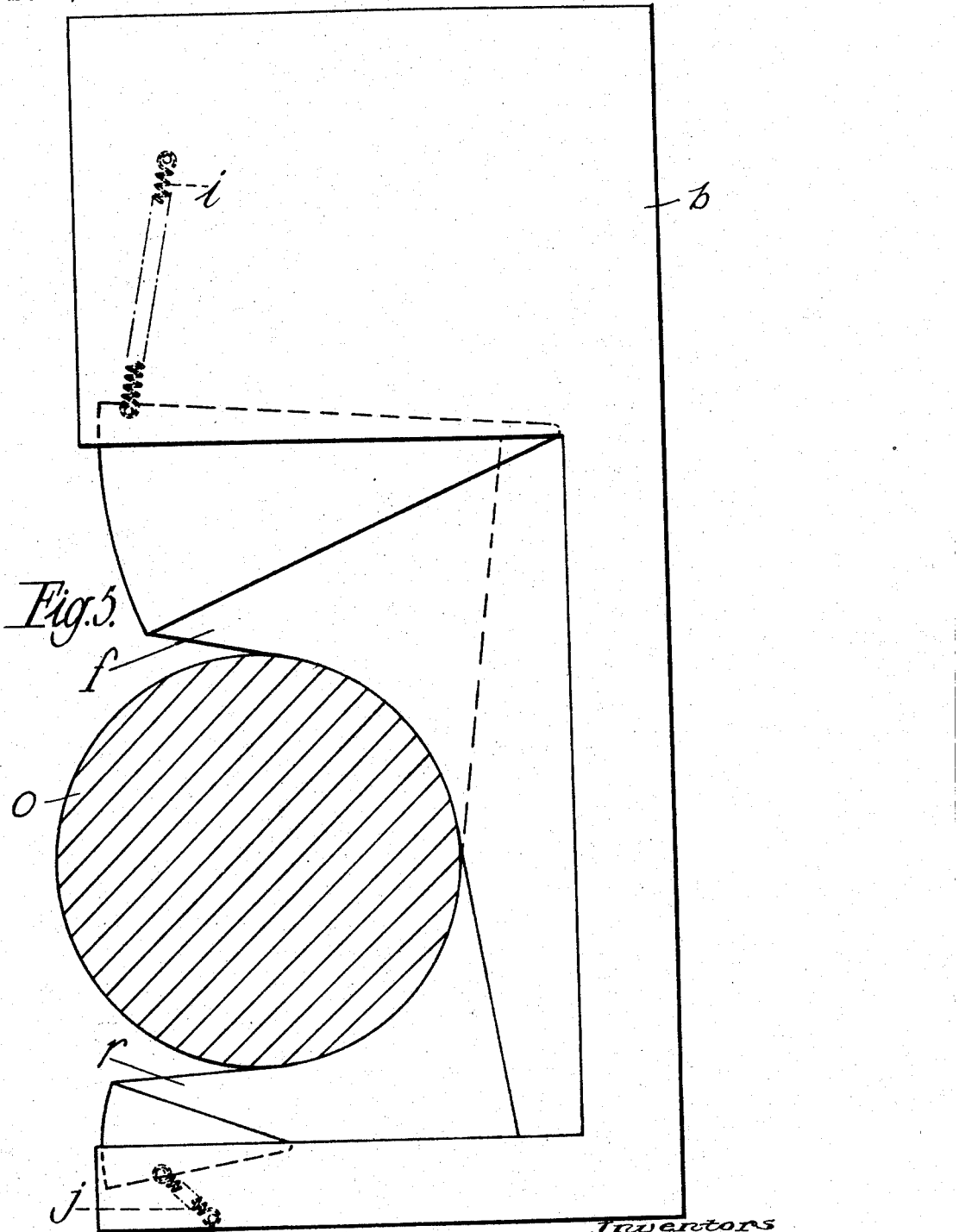

Jan. 20, 1959　　　K. H. CUBITT ET AL　　　2,869,635
AIRCRAFT HANGAR DOORS

Filed June 13, 1957　　　　　　　　　　　　　　6 Sheets-Sheet 5

Inventors
K. H. Cubitt
J. W. Leonard
By Glascock Downing Reebold Attys.

Jan. 20, 1959　　K. H. CUBITT ET AL　　2,869,635
AIRCRAFT HANGAR DOORS

Filed June 13, 1957　　　　　　　　　　　　　　6 Sheets-Sheet 6

Inventors
K. H. Cubitt
J. W. Leonard
By Hascock Downing Seebold
Attys.

United States Patent Office 2,869,635
Patented Jan. 20, 1959

2,869,635

AIRCRAFT HANGAR DOORS

Kenneth Hamilton Cubitt and James William Leonard, London, England, assignors to The Educational Supply Association Limited, London, England Application June 13, 1957, Serial No. 665,425

2 Claims. (Cl. 160—118)

This invention relates to doors for aircraft hangars of the kind in which only part of the length of one or more aircraft is or are to be housed therein, the remainder being permitted to rest outside the hangar, i. e. external to the doors.

With such hangars there arises the problem of sealing the gap between the adjacent ends of the doors after the latter have been closed as far as permitted by the fuselage at the threshold of the hangar.

In one known solution of this problem, two frames have been provided slidable behind and immediately adjacent to the doors, each frame slidably carrying a panel member shaped on one vertical edge to a contour such that the respective frames may be slid towards each other from opposite sides of the fuselage. The combined contours of these edges of the panel members substantially correspond with the contour of the fuselage at the cross-section thereof lying in the plane containing the panel members, the latter having been appropriately jacked up in their frames to the required level; the opening formed beneath the raised panel members is subsequently closed by any suitable means.

Such arrangement involves the provision of a variety of pairs of panel members, each pair corresponding with half the fuselage contour of a particular aircraft in the plane containing the panel members, and also entails the handling and jacking of necessarily weighty structures.

The object of the present invention is to provide simplified solutions of this problem.

The invention consists in a door closure device having features as set forth in the claims appended hereto.

Referring to the accompanying diagrammatic drawings:

Figure 1 is a front elevational view of part of a pair of hangar doors embodying a door closing device embodying the present invention in one form, the doors being shown in partly open position.

Figure 2 is a similar view with the doors in closed position.

Figure 3 is an enlarged elevational view of one of the panels shown in opposite position in relation to an aircraft fuselage.

Figures 4 and 5 are similar views showing the panel associated with aircraft fuselages of different cross-section.

In carrying the invention into effect according to one form by way of example as shown in Figures 1–3, two frames $a$, $b$ are provided mounted to slide in vertical planes parallel to each other and lying immediately behind a normal track for supporting a pair of sliding and folding doors $c$, $d$.

Each frame member carries a pair of membranes $e$, $f$ formed conveniently of rubber and canvas, each membrane being substantially triangular in form and two membranes being supported in a notch at one side of each panel. The upper and lower edges of the respective membranes are attached to metal sector pieces $g$, $h$ hinged at one end to the respective panels and urged upwardly and downwardly respectively by springs $i$, $j$ or other means by which they may exert forces on the membranes tending to hold them in flat condition and to enable them automatically to seal the aperture over a wide range of varying shaped aircraft fuselages.

In operation, with an aeroplane fuselage $g$ resting across the threshold of the hangar doorway, the panels—one on each side of the fuselage—are moved towards each other to bring the leading edges $k$, $m$ of the membranes into contact with the sides of the fuselage. As the panels partially overlap, the leading edges of the pairs of membranes become wrapped around the fuselage surface so as substantially to seal the gap around that surface.

The sliding folding doors $c$, $d$ may then be moved into position abutting or overlapping the trailing edges of the panels.

The membranes of panel $b$ are shown in Figures 4 and 5 in operative position in relation to fuselages $n$ and $o$ of two different aircraft from that shown in Figure 3.

Preferably the leading edges of the membranes are stiffened or reinforced by rubber tubing, beading or moulding.

In a modified arrangement shown in Figures 6–9 of the drawings, a subsidiary track 2 is provided lying immediately behind a normal track 3 supporting a pair of sliding and folding doors $c$, $d$ and on this subsidiary track a pair of frame members $a$, $b$ are mounted. Each frame member carries a number of horizontally slidable slats or fingers 4 which are mounted one above another in a vertical row so as to lie in the plane of the frame, this plane being parallel to the vertical plane containing the main track 3.

Figure 6:
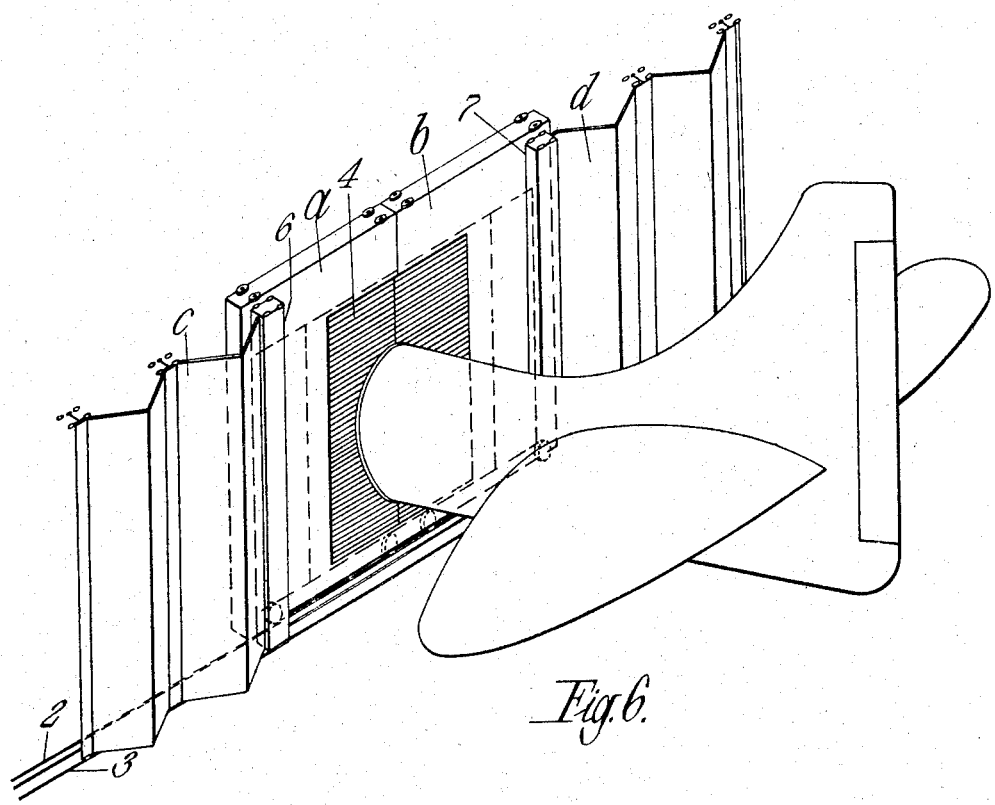
Figure 6 is a perspective view of a closing device of a modified form embodying the present invention.
Figure 7:
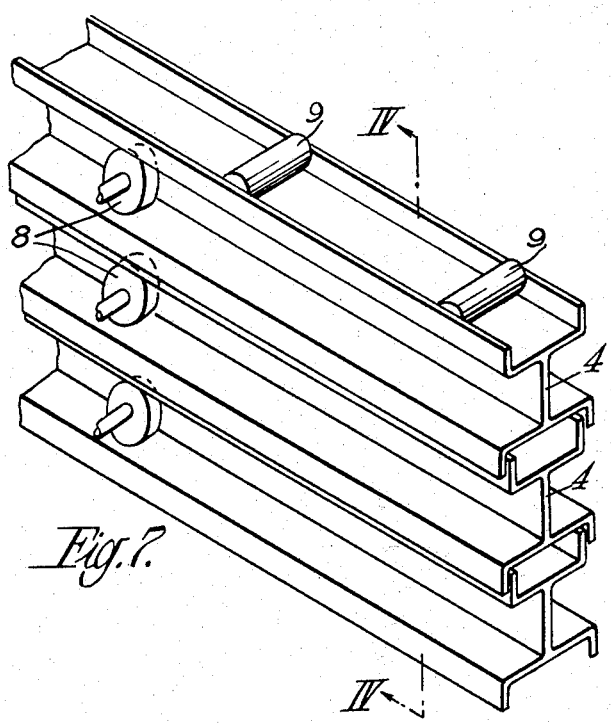
Figures 7 and 8 are perspective views of a detail thereof, whilst
Figure 9:
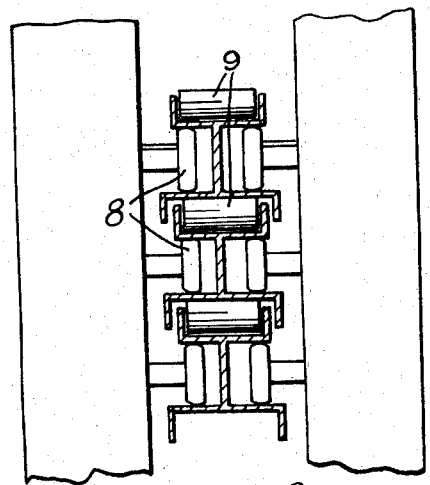
Figure 9 is a vertical sectional view on the line IX—IX of Figure 7.
Figure 8:
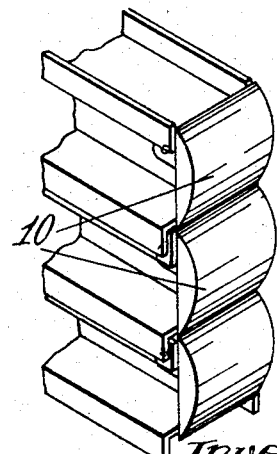

The rows of slats extend from near ground level to the tops of notches in the panels and the arrangement is such that when an aircraft 5 is placed in position with its fuselage projecting across the threshold and the normal sliding and folding doors $c$, $d$ are closed to the position shown in Figure 6, the remaining gap between the adjacent edges 6, 7 of the doors may be filled by bringing the respective frame members $a$, $b$ into mutual contact, thus causing the fingers coming in contact with the sides of the fuselage to move outwards, the forward edges remaining in abutment with the sides of the fuselage; those fingers above the top of the fuselage and below the bottom thereof on one frame will abut their opposite numbers on the other frame as shown.

The fingers may be constructed of any cross-section but conveniently may comprise extruded sections of light metal alloy as shown, supporting rollers 8 and guide rollers 9 being provided for permitting the individual fingers to be moved readily.

The ends of the fingers where they abut the fuselage may be furnished as shown with resilient material 10 in order to make an effective sealing joint with the fuselage contour or any other convenient means may be provided for producing this result. For example, a strip of resilient material of U-section may be wrapped around the periphery of the fuselage for engagement by the forward ends of the fingers.

Any convenient means may be provided for effecting the individual horizontal movements of the fingers, for example, vertical rows carrying discs frictionally engaging the fingers. Resilient flaps may also be fitted to the fingers so as to seal the spaces between individual pairs of fingers.

Figure 11:
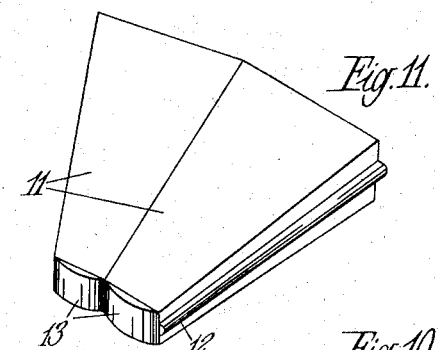
Figure 11 is a perspective view of a detail thereof.
Figure 10:
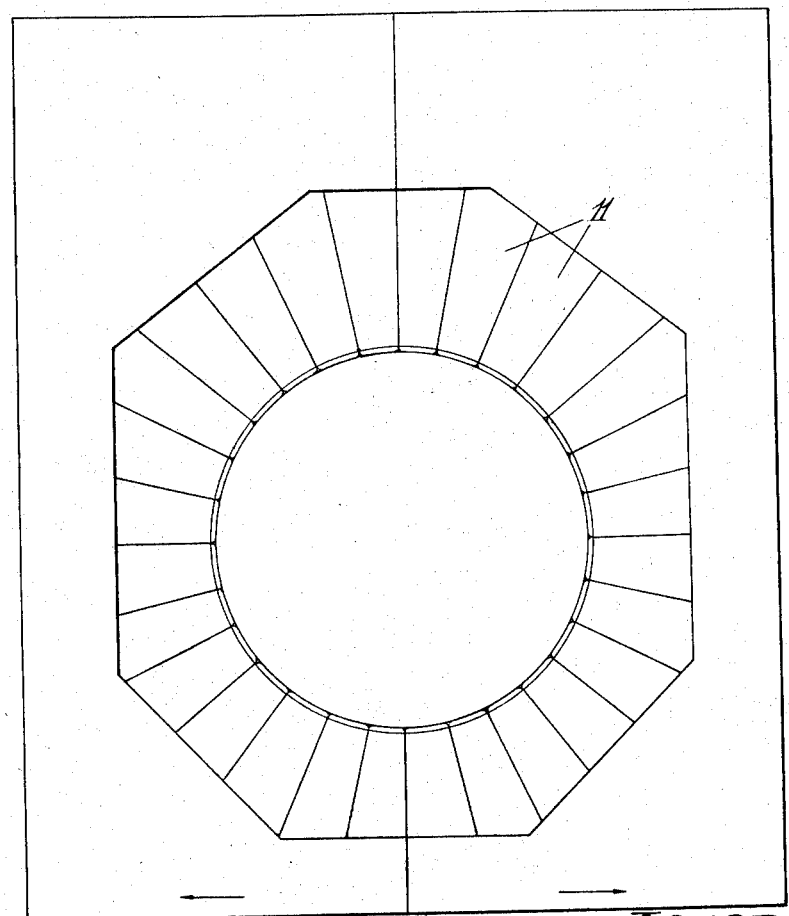
Figure 10 is an elevational view of a modified form of closure device embodying the present invention.

In a modified arrangement shown in Figures 10 and 11, a plurality of inflatable bags 11 in place of the membranes on each panel are disposed radially around a shape complementary to that of the aircraft, each bag being approximately rectangular cross-section tapering to narrow section at the leading edge of the panel and tongued at 12 and formed so as to support one another.

The bags are furnished with nose portions 13 of material having greater flexibility than that of the bags themselves and the bags are conveniently secured to one another by internal cords.

In operation, the panels are brought towards a fuselage with the bags in deflated condition and when the leading edges of the panels meet above and below the fuselage the bags are inflated so that their flexible nose portions impinge on the fuselage. Each bag impinges on each side with its neighbouring bags thus substantially occupying the space which formerly existed between the confines of the notched frame and the fuselage.

The arrangement described above will permit a portion of an aircraft to be housed within a hangar, a further portion projecting in front of the hangar, the former portion being substantially completely housed within the hangar space when the folding and sliding doors and the frames and fingers are in the closed position indicated above.

If desired, however, a hangar may be adapted for receiving two or more aircraft simultaneously in a similar manner by providing a further set or sets or freely operable door sections and additional frame members with fingers, flexible membranes or inflatable bags, as described above.

In a particular arrangement where two separate aircraft are to be accommodated, two pairs of frame members are provided supported on the subsidiary track and the sliding and folding doors comprise three sections, namely a central freely movable section and two end sections attached to one edge respectively to the uprights bounding the front opening of the hangar.

In all cases means are preferably provided for locking the doors in position on their main track and also for locking the frames on their subsidiary track.

We claim:

1. In a door closure for an aircraft hangar of the kind referred to with which is associated gap closing means comprising a pair of frames slidable in parallel planes closely adjacent to the adjacent edges of adjacent door sections, the provision of a notch in each frame in which are disposed in partly overlapping relationship a pair of flexible membranes of generally triangular form, one edge of each of which membranes faces outwards of said notch and stretching means coacting with each pair of flexible members tending to stretch said membranes into flat form, the arrangement being such that as the frames are moved towards each other and towards the respective sides of an aircraft fuselage resting across the hangar threshold, the upper and lower portions of said outwardly facing edges of the respective membranes on each panel will wrap around the corresponding contacted parts of the fuselage surface so as substantially to close the gap around said surface.

2. A door closure as claimed in claim 1 wherein the outwardly facing or leading edges of the membranes are stiffened or reinforced.

References Cited in the file of this patent

UNITED STATES PATENTS

| | | |
|---|---|---|
| 2,420,186 | Miller et al. | May 6, 1947 |
| 2,651,359 | Margison | Sept. 8, 1953 |
| 2,708,927 | Dixon et al. | May 24, 1955 |
| 2,739,645 | Urquhart | Mar. 27, 1956 |
| 2,832,406 | Turenne | Apr. 29, 1958 |